United States Patent [19]

Yasui et al.

[11] Patent Number: 5,319,485
[45] Date of Patent: Jun. 7, 1994

[54] WAVELENGTH-ASSIGNABLE OPTICAL COMMUNICATION SYSTEM

[75] Inventors: Tadahiko Yasui; Aritomo Uemura, both of Kanagawa, Japan

[73] Assignee: Mitsubishi Denki Kabushiki Kaisha, Tokyo, Japan

[21] Appl. No.: 878,487

[22] Filed: May 5, 1992

[30] Foreign Application Priority Data

Oct. 5, 1991 [JP] Japan .................................. 3-104583

[51] Int. Cl.$^5$ .............................................. H04J 14/02
[52] U.S. Cl. ................................... 359/128; 359/124; 359/125; 359/165
[58] Field of Search ................ 359/114, 115, 117, 118, 359/119, 120, 121, 124, 125, 128, 154, 157, 152, 173, 165; 455/34.1, 34.2

[56] References Cited

U.S. PATENT DOCUMENTS

| | | | |
|---|---|---|---|
| 4,409,687 | 10/1983 | Berti et al. ......................... | 455/34.2 |
| 4,745,592 | 5/1988 | Gabriagues ........................ | 359/124 |
| 4,759,011 | 7/1988 | Hicks, Jr. .......................... | 359/126 |
| 4,789,980 | 12/1988 | Darcie et al. ....................... | 370/57 |
| 4,797,879 | 1/1989 | Habbab et al. ..................... | 359/123 |
| 4,807,227 | 2/1989 | Fujiwara et al. ................... | 359/128 |
| 5,212,577 | 5/1993 | Nakamura et al. ................. | 359/124 |

OTHER PUBLICATIONS

G. Prati, "Coherent Optical Communications and Photonic Switching", Tirrenia, Italy Sep. 19-23, 1989 Proceedings of the Fourth Tirrenia International Workshop on Digital Communications.

IEEE Journal on Selected Areas in Communications, vol. 8, No. 6, Aug. 1990 "Dense Wavelength Division Multiplexing Networks ...".

*Primary Examiner*—Leslie Pascal
*Assistant Examiner*—Rafael Bacares
*Attorney, Agent, or Firm*—Wolf, Greenfield & Sacks

[57] ABSTRACT

An optical communication system comprising a plurality of optical signal communication paths, and a plurality of terminals coupled to the plurality of communication paths. A connection request is made by a calling terminal to a called terminal with an optical signal at a control wavelength via the communication path. A wavelength control unit monitors the communication paths and in response to the connection request signal selects an optical signal wavelength to be used by the terminals, out of any unused wavelengths on the communication paths. Further, the wavelength control unit informs the calling and called terminals of the selected wavelength via a wavelength information optical signal at the control wavelength. The calling and called terminals, responsive to the wavelength information signal, set their transmitting and receiving wavelength to the selected unused wavelength.

20 Claims, 15 Drawing Sheets

WAVELENGTH-ASSIGNABLE OPTICAL COMMUNICATION SYSTEM

BACKGROUND OF THE INVENTION

1. Field of the Invention

The present invention relates to an optical communication system, and, more particularly, to an optical communication system capable of assigning an unused wavelength to a connection request from a network in accordance with the wavelengths being used in a wavelength-multiplex communication path. Such a system includes a wavelength-sharing optical exchange system which assigns, to a call, a wavelength suitable for a condition of the exchange network at the time of call and wavelength-multiplexes a plurality of calls so as to effectively utilize a wavelength band.

2. Description of the Prior Art

In an optical communication system according to the prior art which accommodates a plurality of terminals by using wavelength-multiplex communication paths, different wavelengths inherent to the respective terminals are assigned thereto for transmission or reception, so that signals having the same wavelength may not be transmitted through the same wavelength-multiplex communication path. For example, FIG. 1 is a diagram illustrating a conventional optical star-type communication network. In FIG. 1, the reference numeral 201 designates a terminal; 202 a signal source; 203 a transmission light source; 204 a photocoupler; and 205 a receiving circuit capable of selecting a wavelength. FIG. 2 is a diagram illustrating a conventional optical concentrating system using wavelength-multiplex communication paths. In FIG. 2, the reference numerals 201-1 through 201-n designate terminals; 206 a wavelength-multiplex communication path; 207 a network accommodating wavelength-multiplex communication paths 206; and 208 an interface for interconnecting communication path 206 and network 207.

In operation, a wavelength $\lambda 1$ inherent to terminal 201-1 is assigned to transmission light source 203 contained in terminal 201-1. When a signal is transmitted to terminal 201-1 from any other terminal, a signal having wavelength $\lambda 1$ is transmitted to terminal 201-1 via photocoupler 204 and then receiving circuit 205 in terminal 201-1 selects the signal having wavelength $\lambda 1$ and receives it. Upon transmission, each terminal decides whether an optical signal having the same wavelength as that of the signal to be transmitted exists on the communication path. If there is no such optical signal on the communication path, that terminal starts transmission of the signal. In FIG. 2, wavelengths $\lambda 1$ through $\lambda n$ for transmission are fixedly assigned to transmission light source 203 in the respective terminals 201-1 through 201-n, such that the wavelengths are not overlapped. Optical signals transmitted from the respective terminals are multiplexed on wavelength-multiplex communication path 206 via photocouplers 204 and coupled to network 207.

As explained above, in a method of fixedly assigning to terminals reception wavelengths and transmission wavelengths inherent to the respective terminals, the number of terminals is limited by the wavelengths because each wavelength corresponds to one particular terminal. Even if the wavelength assigned to one terminal is not in use, this wavelength cannot be used by other terminals, resulting in inefficient utilization of wavelength.

FIG. 3 illustrates a space-sharing optical exchange system as disclosed in the Japanese Patent Public Disclosure No. 48895/87. In FIG. 3, the reference numerals 301 through 304 designate terminals; 305 an optical switchboard; 341 through 344 subscriber optical fibers; and 351 through 354 optical switches. Respective terminals 301 through 304 each include two light sources having wavelengths $\lambda 1$ and $\lambda 2$ and select either one of the wavelengths for transmission.

In operation, switchboard 305 directly interconnects optical switches 351 and 354. Each of terminals 301 through 304 includes two light sources having wavelengths of $\lambda 1$ and $\lambda 2$ as explained above and selects an optical signal having either one of the wavelengths for transmission. For example, if communication is required between terminal 301 and terminal 304, terminal 301 transmits a signal having wavelength $\lambda 1$ while terminal 304 transmits a signal having wavelength $\lambda 2$. At the same time, switchboard 305 establishes a communication path running from subscriber fiber 341 through optical switches 351 and 354 to subscriber fiber 344. In this way, terminals 301 and 304 may be interconnected. Before communication between two terminals is commenced, transmitting and receiving wavelengths to be used by each terminal are instructed by a subscriber signal from a control circuit of optical switchboard 305 to a control circuit of the respective terminals.

As explained above, according to a system of assigning a wavelength to a call, respective terminals and an optical switchboard are interconnected in a star form, requiring a high cost of concentration. Besides, wavelength-multiplexing is merely available for upward and downward signals in a wavelength-multiplex communication path, a transmission band contained in a wavelength range is not effectively utilized. Since a network capacity is limited by a spatial switch, any increase in capacity is difficult due to the structure of devices used. If terminals are further added later on, the switchboard has to be modified.

SUMMARY OF THE INVENTION

The present invention has been proposed to eliminate such problems as pointed out above, and an object of the present invention is to provide an optical communication system which is capable of effectively utilizing wavelengths by assigning a wavelength to a call from a terminal in accordance with a connection request from the terminal, avoiding interference occurred by using the same wavelength on a wavelength-multiplex communication path and easily increasing the number of terminals.

Another object of the present invention is to provide a wavelength-sharing optical exchange system which is capable of effectively utilizing a transmission band contained in a wavelength range of a wavelength-multiplex communication path, accommodating terminals in respective wavelength-multiplex communication paths, the number of the terminals being more than the number of multiplexed wavelengths, having a large network capacity, eliminating the necessity of wavelength modulation within an optical switchboard and easily controlling the switchboard.

A further object of the present invention is to provide an optical switch unit suitable for the wavelength-sharing optical exchange system and capable of spatially and independently exchanging optical signals of different wavelengths in respective wavelength-multiplex communication paths accommodated in the optical exchange system.

In order to attain the above-described objects, an optical communication system according to the present invention comprises a wavelength control unit which is capable of monitoring wavelengths used in wavelength-multiplex communication paths, selecting a wavelength unused in any wavelength-multiplex communication path in response to a connection request made by means of a control wavelength from a terminal and informing the calling and a called terminal of the selected wavelength using the control wavelength.

An optical communication system according to the present invention operates to monitor the wavelengths already assigned to the wavelength-multiplex communication path to which the calling terminal belongs, when a connection is requested, and assign a wavelength unused in the wavelength-multiplex communication path to the terminal which has issued a connection request and the terminal at the other end.

A wavelength-sharing optical switching system is provided as a specific example of the optical communication system according to the present invention.

The wavelength-sharing optical exchange system utilizes wavelength-multiplex communication paths as optical communication paths, and a control wavelength controlling each call made by a network channel control unit is preset. The network channel control unit serves to assign a wavelength used between terminals. Subscriber-line control units serve to send call control signals at control wavelengths for respective wavelength-multiplex communication paths and an optical switching unit executes spatial switching for respective wavelengths.

The network channel control unit causes a wavelength table to store the terminals on the respective wavelength-multiplex communication paths accommodated in the optical switchboard and wavelengths assigned to the respective terminals, and manages spatial connections between respective input and output lines for each of all the wavelengths used on the communication paths and controls connection of the optical switching unit.

When a call is made, the network channel control unit accommodating the calling terminal makes inquiries, at a control wavelength, to another network channel control unit provided on the path through which the call passes, and investigates what wavelengths are used on the path interconnecting the calling and called terminals. The network channel control units on both sides of the optical switchboard list up the wavelengths usable to interconnect input and output wavelength-multiplex communication paths through the switchboard by judging from the wavelengths which are not occupied and usable in the input and output wavelength-multiplex communication paths and the wavelength corresponding to one of the spatial switches capable of interconnecting the input and output wavelength-multiplex communication paths. Spatial switches are provided for respective wavelengths. The network channel control unit accommodating the called terminal decides whether the terminal at the other end is available for communication, and informs the calling terminal of that fact. If the called terminal is available, the network channel control unit accommodating the calling terminal selects a wavelength to be assigned to the call out of the wavelengths available in all the connection paths between the both terminals, informs the respective channel control units of the wavelength to be used, informs the respective terminals of the wavelength to be used via the subscriber control units, controls the optical switchboard in accordance with the information about the determined wavelength and establishes a channel between the calling and called terminals.

BRIEF EXPLANATION OF THE DRAWINGS

FIG. 6 is a block diagram illustrating an entire structure of a wavelength-sharing optical exchange system which the present invention is applied to;

DESCRIPTION OF PREFERRED EMBODIMENTS

Figure 1:
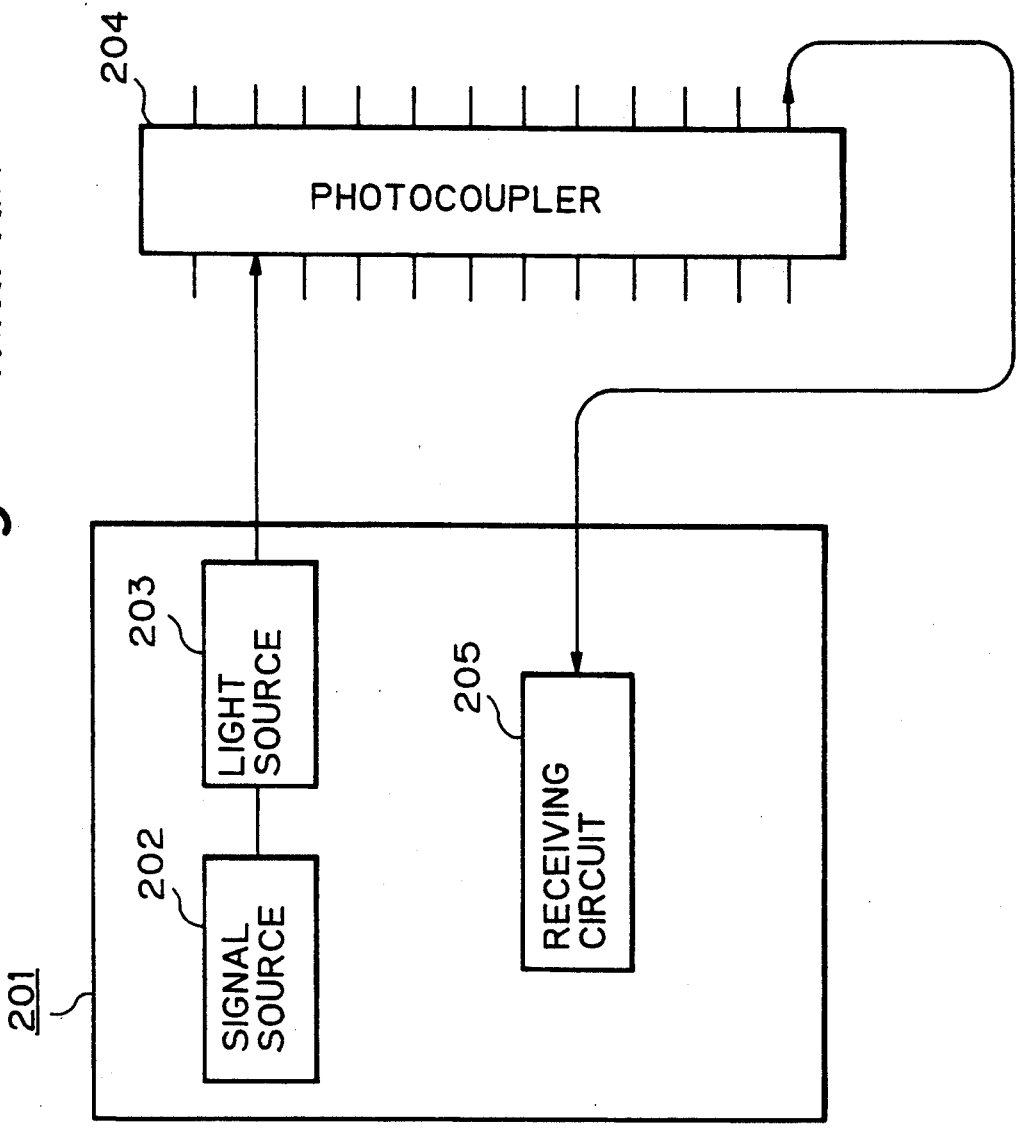
FIG. 1 illustrates a star-type communication network according to the prior art.
Figure 2:
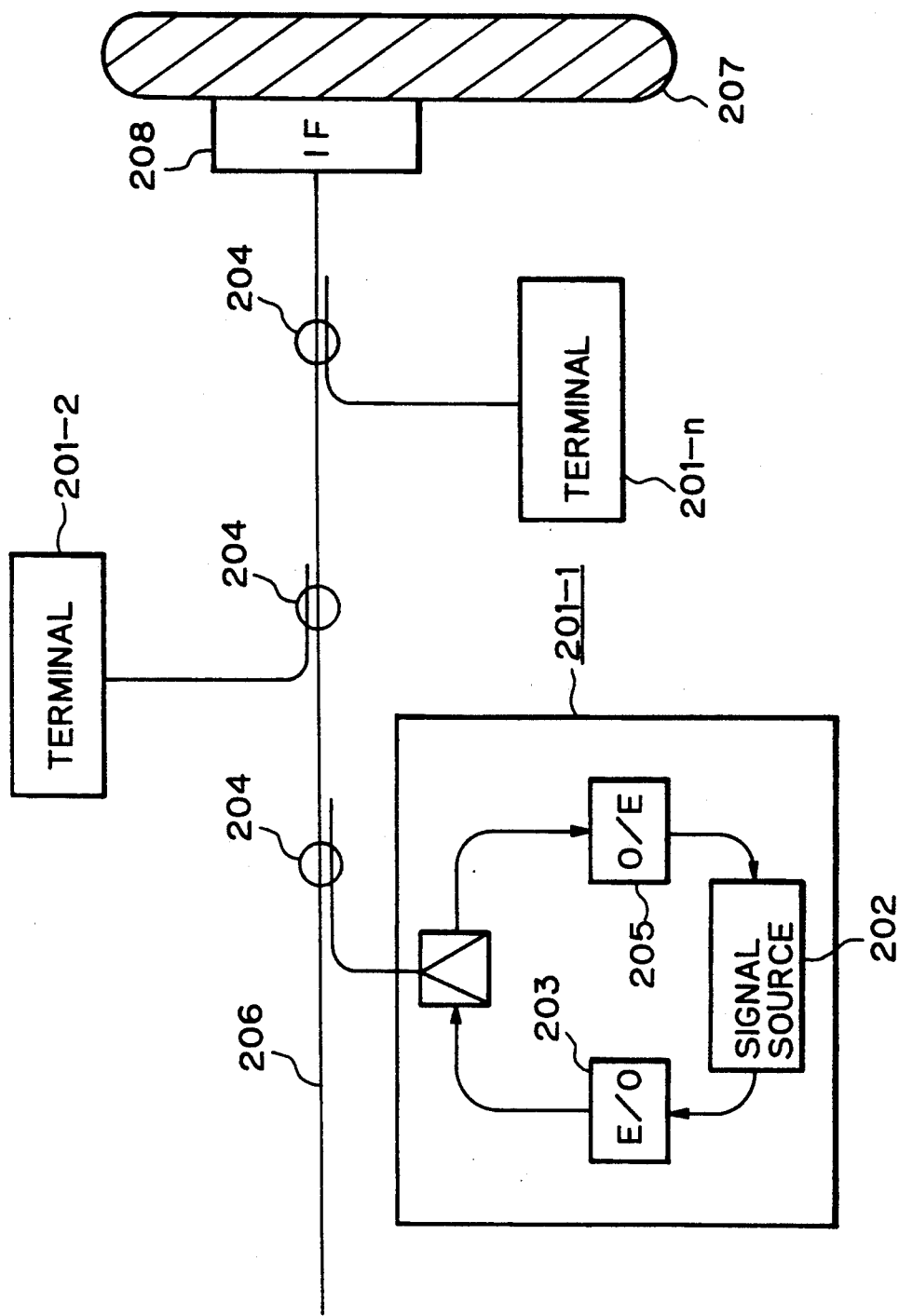
FIG. 2 is a schematic diagram of a conventional optical concentrating network utilizing wavelength-multiplex communication paths.
Figure 3:
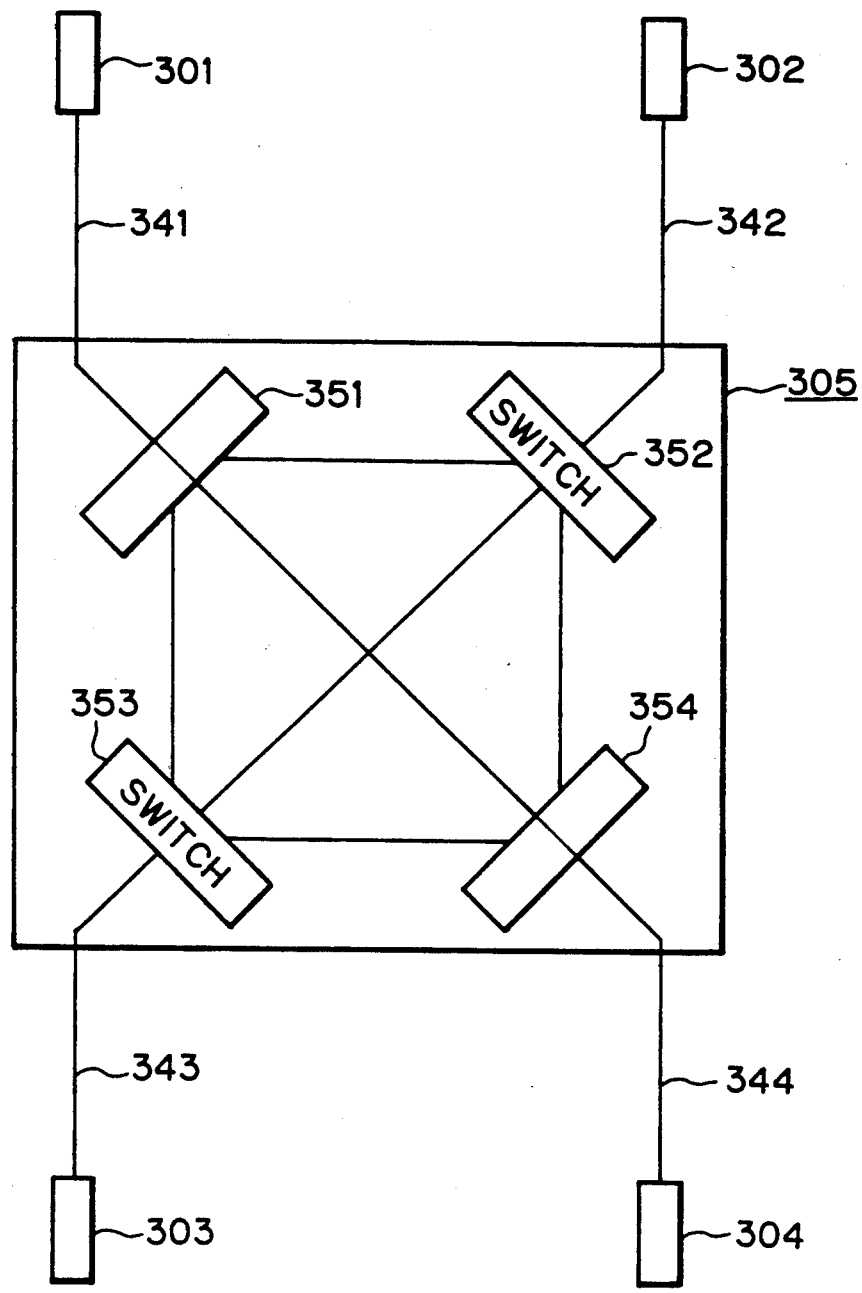
FIG. 3 illustrates an example of a conventional wavelength assigning system.
Figure 4:
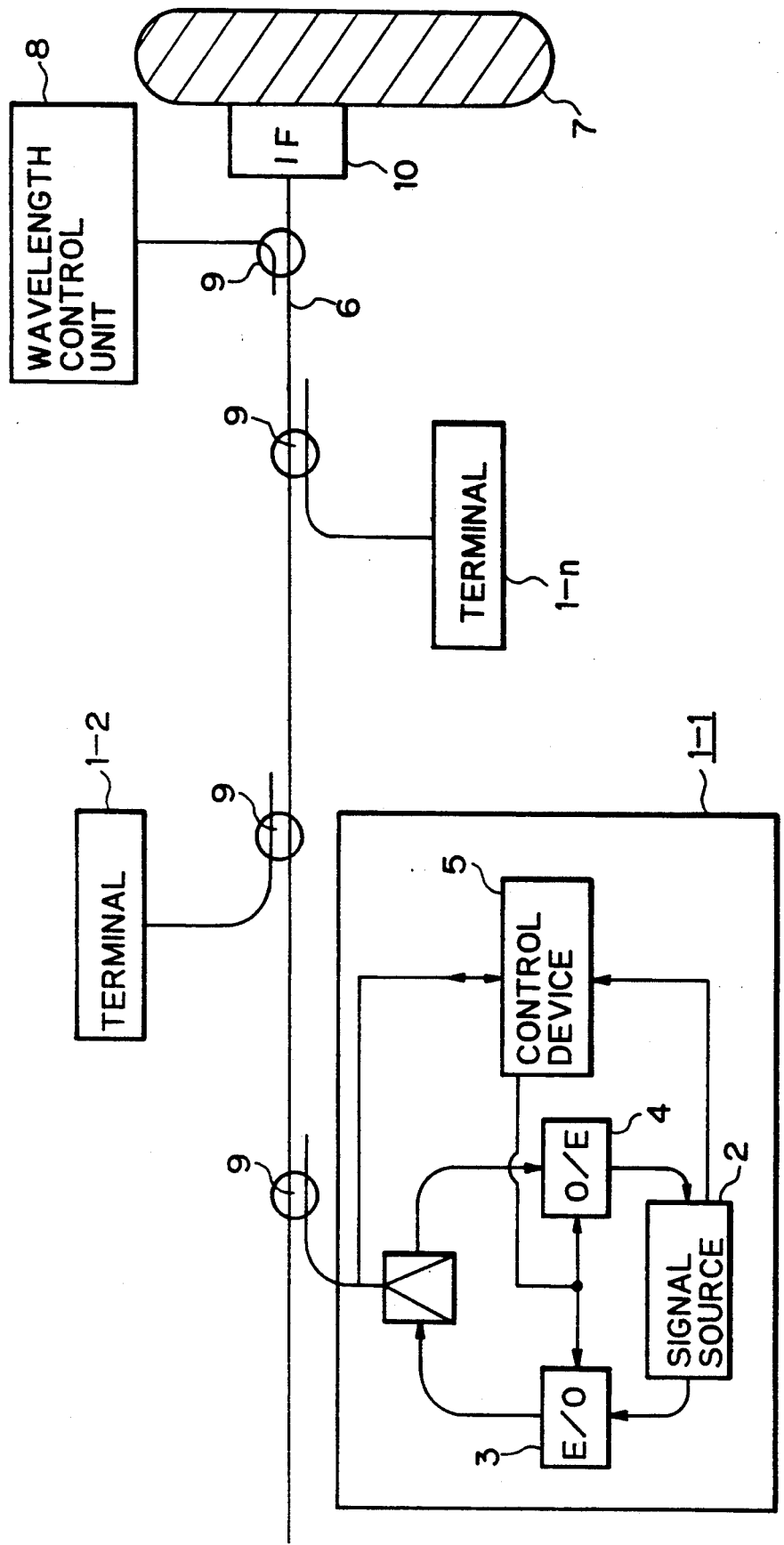
FIG. 4 illustrates the structure of an embodiment of an optical communication system according to the present invention.

An embodiment of an optical communication system according to the present invention will now be explained with reference to the accompanying drawings. In FIG. 4, the reference numerals 1-1, 1-2, . . . , 1-n designate terminals. Each of the terminals includes a signal source 2, a light source 3 capable of controlling an oscillation wavelength, a receiving circuit 4 capable of selecting a wavelength and a control device 5. The reference numeral 6 designates a wavelength-multiplex communication path (only one path is shown in the figure); 7 a network accommodating the wavelength-multiplex communication paths; 8 a wavelength control unit serving for the entire communication paths; 9 a photocoupler; and 10 an interface for interconnecting wavelength-multiplex communication path 6 and network 7.

Operation of the optical communication system will next be explained. When communication is required, for example, from terminal 1-1 to network 7 through wavelength-multiplex communication path 6, terminal 1-1 sends a transmission request to wavelength control unit 8 through control device 5 within terminal 1-1. A call from control device 5 in terminal 1-1 to wavelength control unit 8 is made by means of the CSMA/CD method, the token passing method, the TDMA method or the like. The transmission request is carried through a control channel. The control channel may be wavelength-multiplexed on communication path 6, or a physical line separate from the communication path, may be provided for control purpose. Wavelength control unit 8 monitors the wavelengths being used in wavelength-multiplex communication path 6 to which terminal 1-1 belongs, and selects a wavelength which is not overlapped with the wavelengths being used on communication path 6 and informs control device 5 in terminal 1-1 of the unused wavelength via the control channel. Control device 5 in terminal 1-1 causes the oscillation wavelength of light source 3 to be adjusted to the wavelength instructed by wavelength control unit 8 so as to connect terminal 1-1 with network 7 via wavelength-multiplex communication path 6 and interface 10. Interface 10 connecting network 7 with wavelength-multiplex communication path 6 so controls that used wavelengths may not be overlapped in order to avoid any interference between different optical signals flowing through different communication paths. Reception wavelength is, like the transmission operation, set to receiving circuit 4 by control device 5 in accordance with the instructions from wavelength control unit 8 whereby reception is enabled. The wavelength for transmission may be identical to or different from the wavelength for reception. In this way, two terminals and the network are interconnected by adjusting the transmission wavelength and the reception wavelength to the instructed wavelength(s).

In the above-described embodiment, a wavelength to be assigned to terminal 1-1 is determined in accordance with the wavelengths not being used in a wavelength-multiplex communication path. It is also possible to determine a wavelength to be assigned to a caller by referring to the wavelengths assigned to wavelength-multiplex communication paths contained in one system.

An embodiment of a star-type communication network will next be described.

Figure 5:
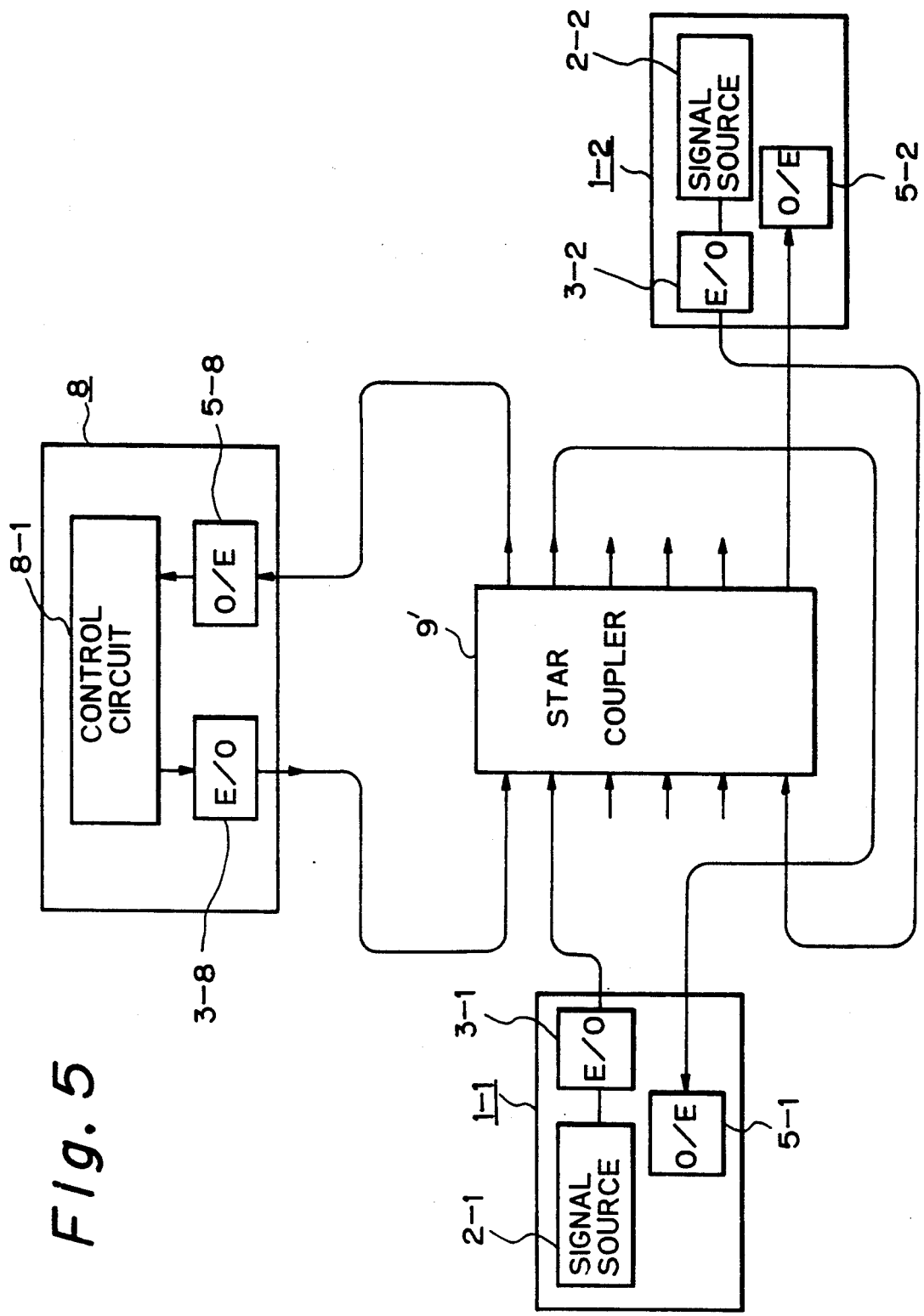
FIG. 5 illustrates the structure of another embodiment of an optical communication system according to the present invention.

In FIG. 5, when terminal 1-1 requests to be connected to terminal 1-2, terminal 1-1 sends a connection request to wavelength control unit 8 at a control wavelength. Wavelength control unit 8 decides whether terminal 1-2 at the other end is available for communication. If available, wavelength control unit 8 informs terminal 1-1 and terminal 1-2 of an unused wavelength using the control wavelength such that the used wavelengths may not be overlapped in star coupler 9' serving as a part of the wavelength-multiplex communication path. Control circuit 8-1 in wavelength control unit 8 manages wavelengths in use and the operation of the respective terminals. Terminal 1-1 and terminal 1-2 receive a signal from control circuit 8-1 in wavelength control unit 8 by means of receiving circuits 5-1, 5-2 which have been adjusted to the control wavelength, and adjust transmission and reception wavelengths to the wavelength indicated by the control wavelength, whereby the terminals at both ends may be connected. The reference numerals 2-1, 2-2 designate signal sources; 3-1, 3-2, 3-8 light sources adapted to convert electrical signals to corresponding optical signals to be transmitted; and 5-1, 5-2, 5-8 receiving circuits for converting optical signals to corresponding electrical signals.

As explained above, the present invention is so structured that a wavelength control unit assigns unused wavelengths to terminals in accordance with the wavelengths already used in the wavelength-multiplex communication path. Accordingly, wavelengths may be effectively utilized and a tree-network may be constructed. Also, additional terminals may be easily attached to communication paths.

A concrete example of the optical communication system according to the present invention is a wavelength-sharing optical exchange system, which will now be described.

Figure 6:
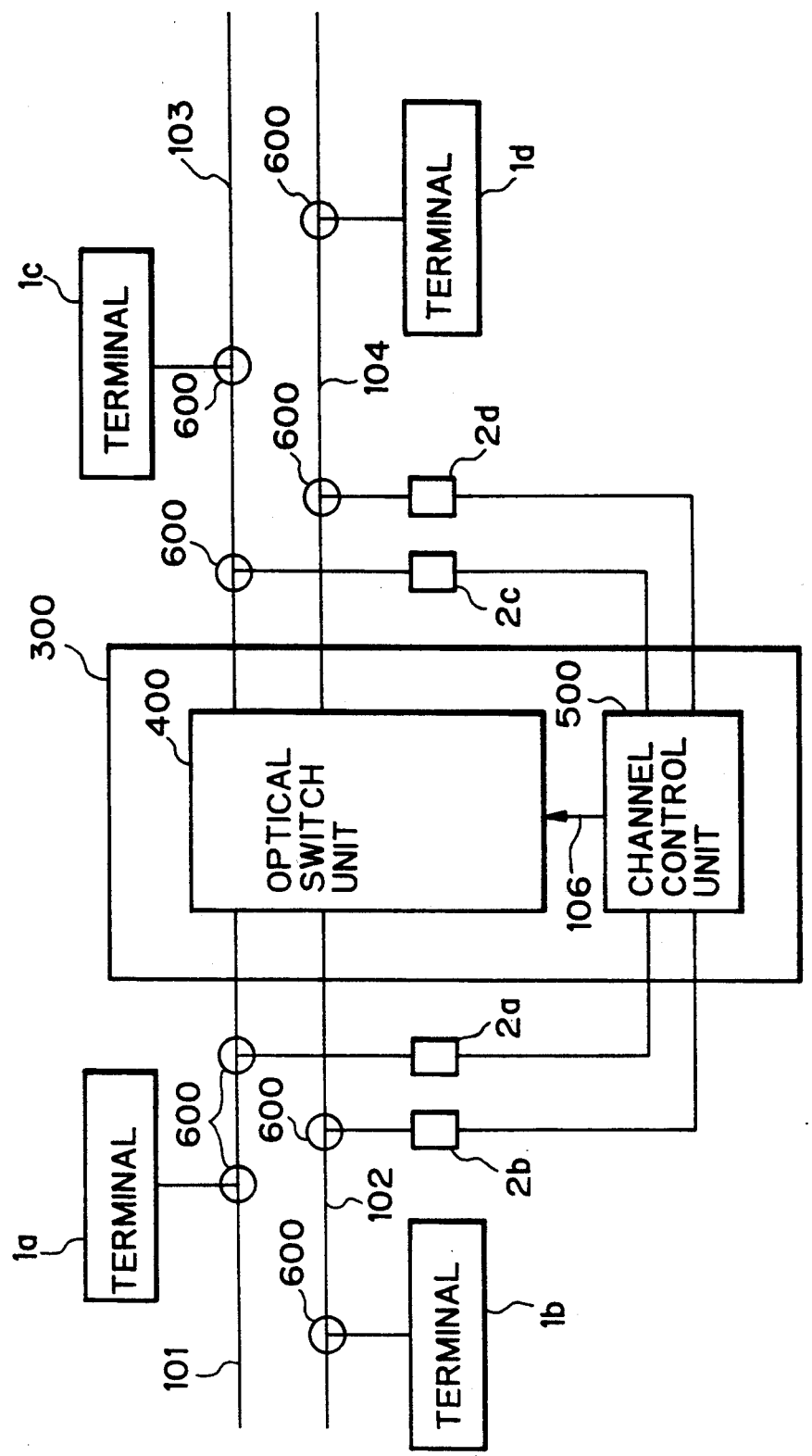

FIG. 6 is a block diagram illustrating an entire structure of a wavelength-sharing optical exchange system according to the present invention. In FIG. 6, the reference numerals 1a through 1d designate terminals; 2a through 2d subscriber-like control units; 300 an optical switchboard; 400 an optical switch unit; 500 a network channel control unit; 600 a coupler; and 101 through 104 wavelength-multiplex communication paths.

Figure 7:
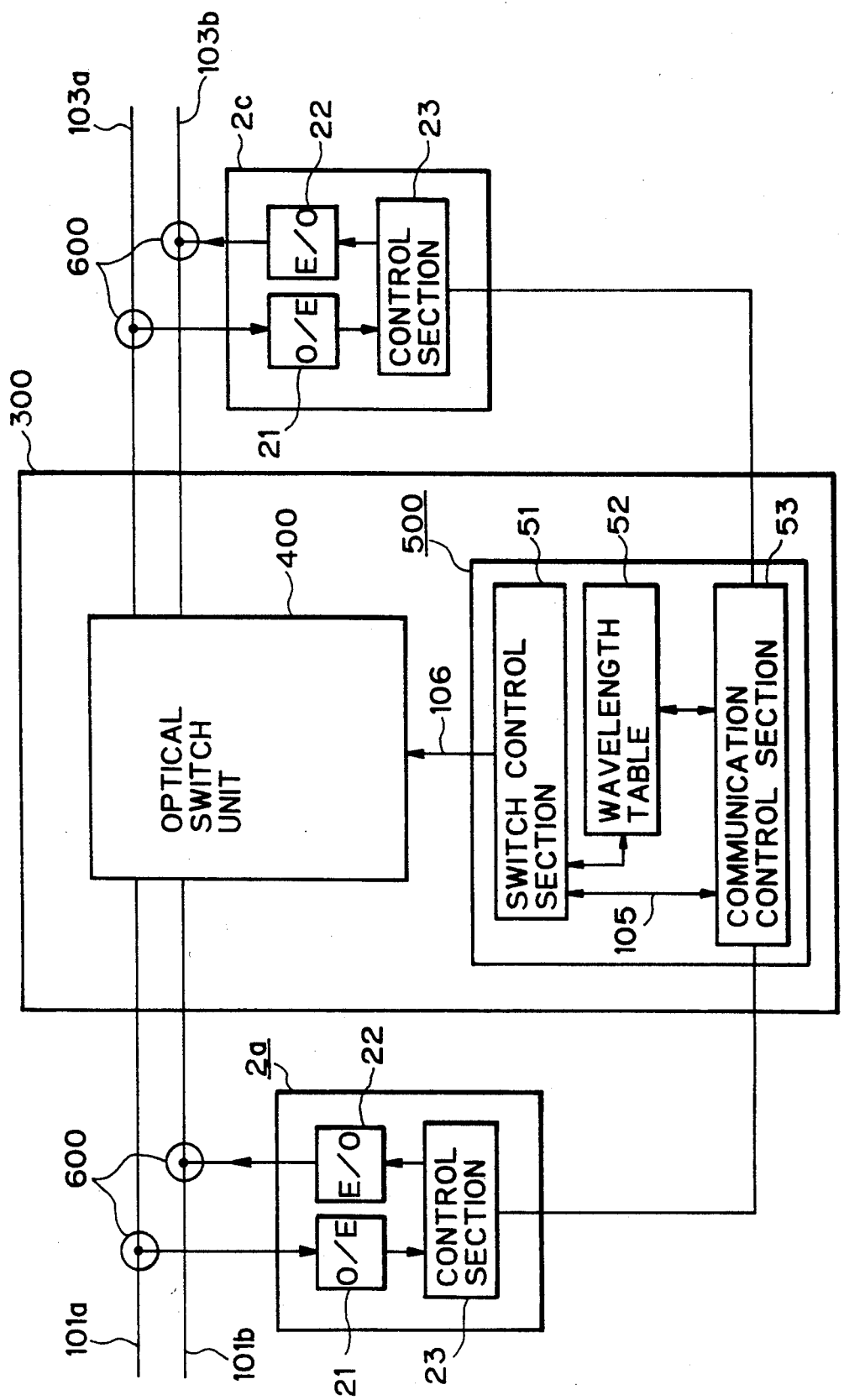
FIG. 7 is a block diagram illustrating in detail the structure of an optical switchboard and subscriber line control units shown in FIG. 6.

FIG. 7 illustrate in detail subscriber-line control units 2a through 2d, network channel control unit 500 and wavelength-multiplex communication paths and how they are interconnected. In FIG. 7, the reference numeral 21 designates a photoelectric converter for converting an optical signal of a control wavelength $\lambda c$ to an electric signal; 22 a laser diode (hereinafter called an LD) for transmitting control wavelength $\lambda c$ in accordance with an electric signal; 23 a control section; 51 a switch control section; 52 a wavelength table for storing the wavelengths used in the switching network; and 53 a communication control section for executing communication control between the respective terminals and network channel control unit 500. It is to be noted here that each of wavelength-multiplex communication paths 101 and 103 is consisted of upward wavelength-multiplex communication paths 101a, 103a carrying signals to optical switchboard 300 and downward wavelength-multiplex communication paths 101b and 103b carrying signals from optical switchboard 300. Other wavelength-multiplex communication paths 102, 104 are also similarly constituted.

Operation of the optical exchange system will next be described with reference to FIGS. 6 and 7. When terminal 1a requests communication with terminal 1c, terminal 1a first sends a call request at control wavelength $\lambda c$ through wavelength-multiplex communication path 101a to terminal 1c. Control wavelength $\lambda c$ is directed via coupler 600 to photoelectric converter 21 within subscriber-line control unit 2a. Subscriber-line control unit 2a can detect a call sent from any one of the terminals connected to wavelength-multiplex communication path 101 by the TDMA method, the CDMA/CD method, the token passing method or the like. Upon receipt of a connection request from terminal 1a, subscriber-line control unit 2a sends the request to network channel control unit 500. Network channel control unit 500 decides whether terminal 1c at the other end is available for communication by retrieving wavelength table 52. If terminal 1b is available for communication, communication control section 53 instructs switch control section 51 to assign a wavelength to terminal 1a and establish a communication path in optical switch unit 400. Switch control section 51 (1) looks through wavelength table 52 to find a wavelength unused in the exchange network, or, in both wavelength-multiplex communication paths 101 and 103, (2) selects, out of the unused wavelengths, a wavelength λx to be assigned to the call, (3) causes wavelength table 52 to store information relating to assigned wavelength λx and the channel used, (4) informs communication control section 53 of wavelength λx, and (5) causes optical switch unit 400 to establish communication paths from wavelength-multiplex communication paths 101a to wavelength-multiplex communication path 103b as well as from wavelength-multiplex communication path 103a to wavelength-multiplex communication path 101b. Communication control section 53 informs control sections 23 contained in subscriber-like control units 2a and 2c of assigned wavelength λx and the used channel. Control sections 23 in units 2a and 2c inform terminals 1a and 1c of assigned wavelength λx via wavelength-multiplex communication paths 101b and 103b, respectively, at control wavelength λc using laser diodes 22. Terminals 1a and 1c set transmission and reception wavelengths to wavelength λx informed through control wavelength λc and commence communication. When communication is finished and the call is interrupted, the content recorded in wavelength table 52 is erased.

Figure 8:
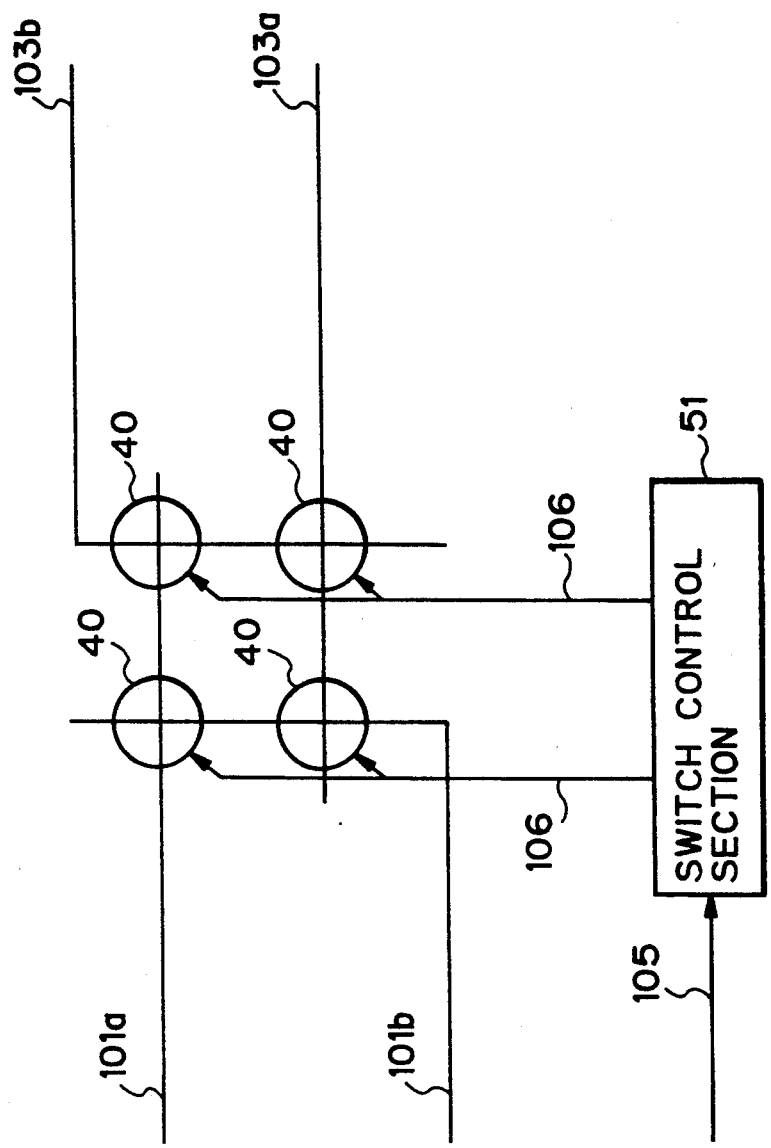
FIG. 8 is used to explain operation of the optical switchboard of the optical exchange system shown in FIG. 6.
Figure 9:
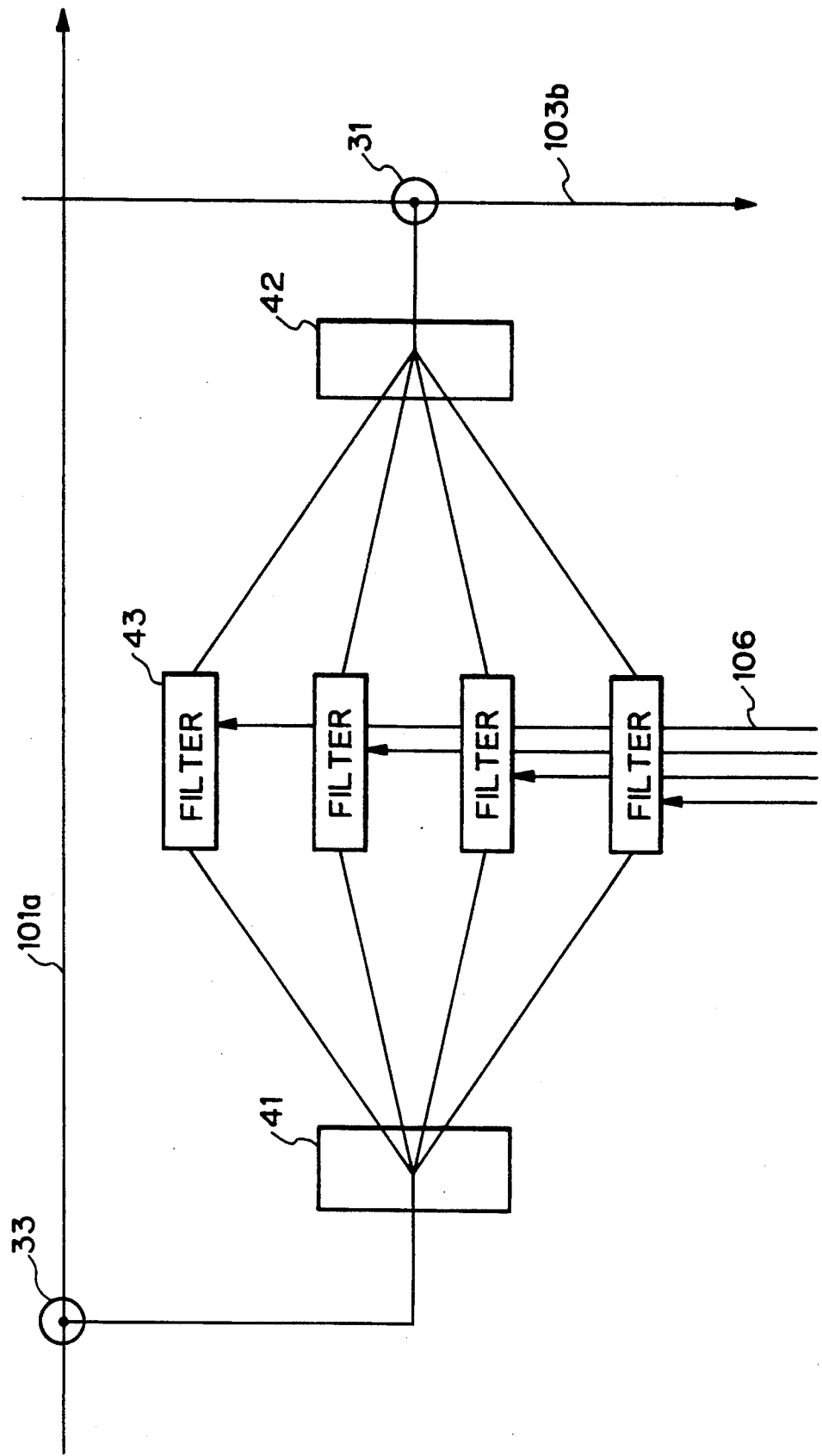
FIG. 9 illustrates a detailed structure of a cross point shown in FIG. 8.

FIG. 8 illustrates the structure of optical switch unit 400. Wavelength signals which come from wavelength-multiplex communication paths 101a and 103a are shown to be switched to wavelength-multiplex communication paths 103b and 101b. The reference numeral 40 designates a cross point, the structure of which is shown in detail in FIG. 9. An optical signal branched from wavelength-multiplex communication path 101a by a branch device 33 is further branched by a branch device 41 and passes through wavelength filters 43 controlled by switch control signals 106 and each corresponding to the wavelengths to be switched. The optical signals are then wavelength-multiplexed by a combining device 42 and coupled to wavelength-multiplex communication path 103b by a combining device 31.

Figure 10:
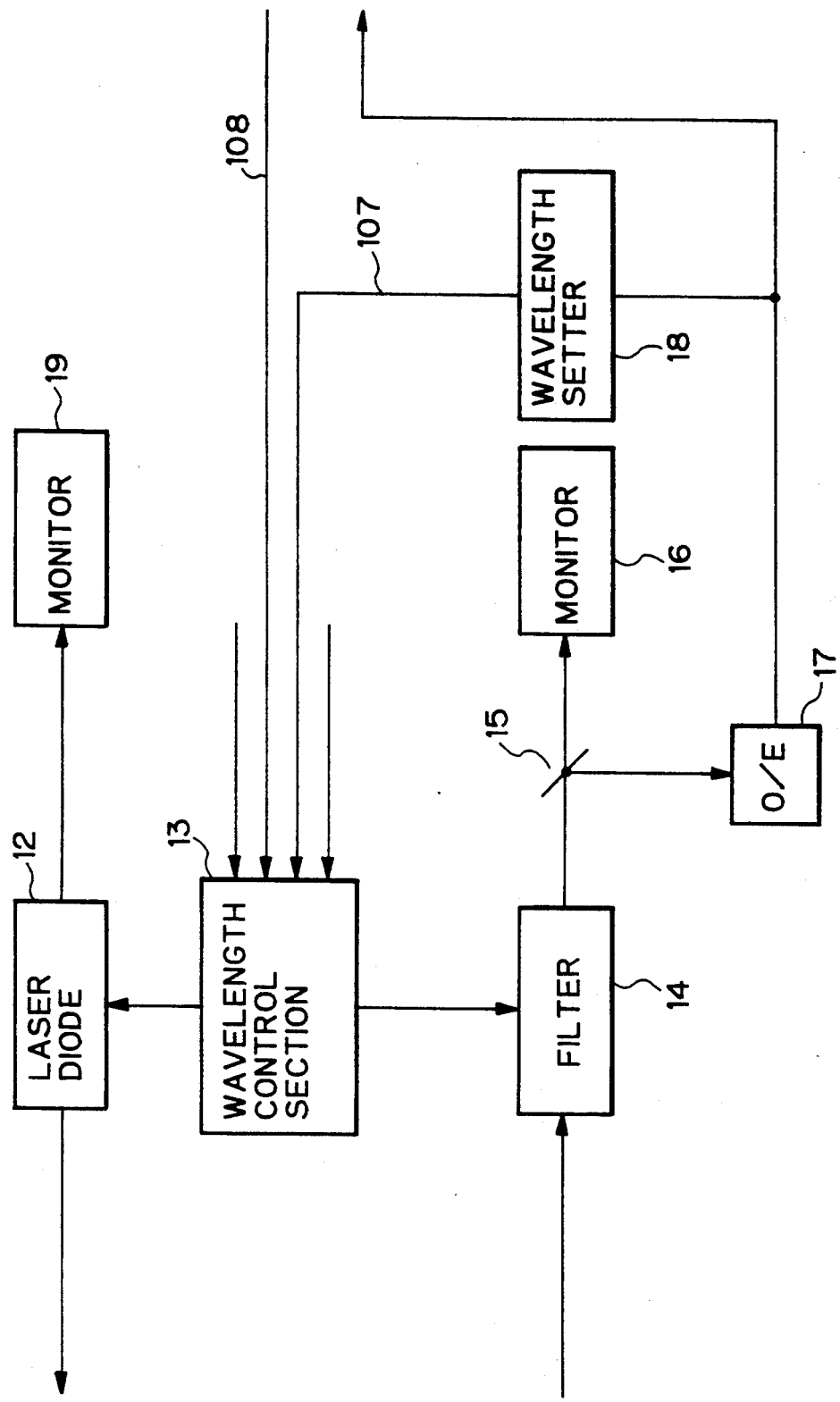
FIG. 10 is a block diagram showing in detail the structure of an interface section of a terminal used in the exchange system shown in FIG. 6.

FIG. 10 illustrate an interface unit provided at each of terminals 1a through 1d. In FIG. 10, the reference numeral 12 designates a wavelength-variable LD; 13 a wavelength control section; 14 a wavelength-variable filter; 15 a branch device; 16 and 19 wavelength monitors; 17 a photoelectric converter; and 18 a wavelength setting section. When a call is made, wavelength control section 13 causes, in response to a call signal 108, the wavelength of wavelength-variable LD 12 to be set to control wavelength λc, thereby enabling the call by using wavelength λc. Wavelength-variable filter 14 is set to control wavelength λc so that the filter can receive a signal at any time except the period of communication. When information about wavelength λx used for communication with the terminal at the other end and designated by optical switchboard 300 is received, the wavelength information is supplied via wavelength-variable filter 14 to photoelectric converter 17 which converts the information to an electric signal and feeds it to wavelength setting section 18. Wavelength setting section 18 instructs wavelength control section 13 to set a communication wavelength to λx based on the wavelength information. Wavelength control section 13 supplies control signals which serve to set the wavelength of light emitted by wavelength-variable LD 12 and the wavelength passable through wavelength-variable filter 14 to λx. Wavelength monitors 16, 19 operate to monitor the reception wavelength and the transmission wavelength and control wavelength control section 13 through feed back loops so as to avoid deviation in wavelength. When the communication is terminated and the call is interrupted, wavelength control section 13 resets wavelength-variable filter 14 so as to be able to receive control wavelength λc.

Figure 11:
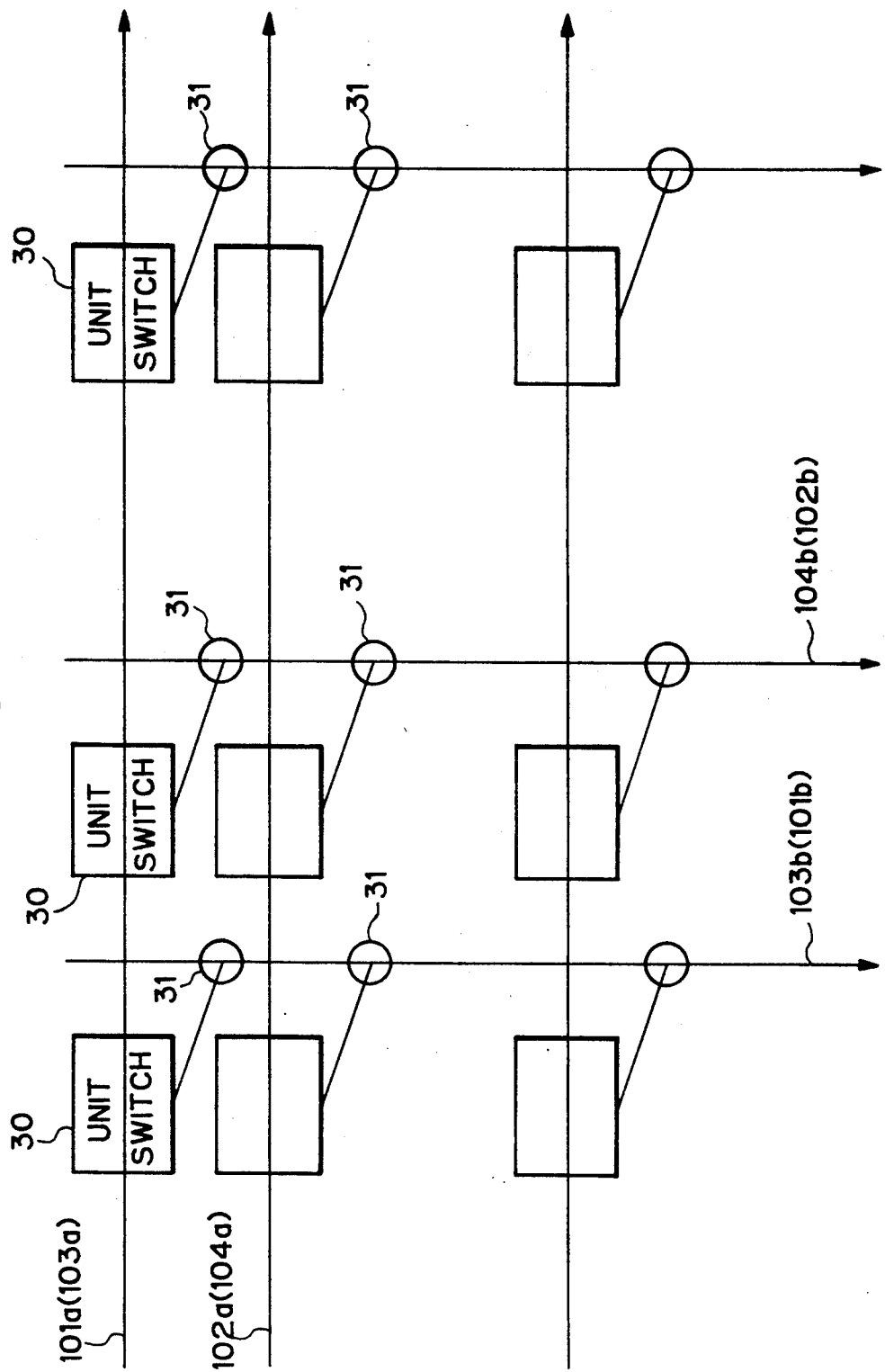
FIG. 11 is used to explain the concept of the switchboard shown in FIG. 6.

FIG. 11 schematically shows an optical switch unit 400. In this figure, the reference numeral 30 designates a unit switch; 101a (103a) and 102a (104a) wavelength-multiplex communication paths carrying signals to optical switchboard 300; 103b (101b) and 104b (102b) wavelength-multiplex communication paths carrying signals from optical switchboard 300; and 31 a combining device. Unit switch 30 functions to take an optical signal of an arbitrary wavelength out of the optical signals passing through one wavelength-multiplex communication path to another optical wavelength-multiplex communication path such that the optical signals of the remaining wavelengths may not be lost from the wavelength-multiplex communication path.

Figure 12:
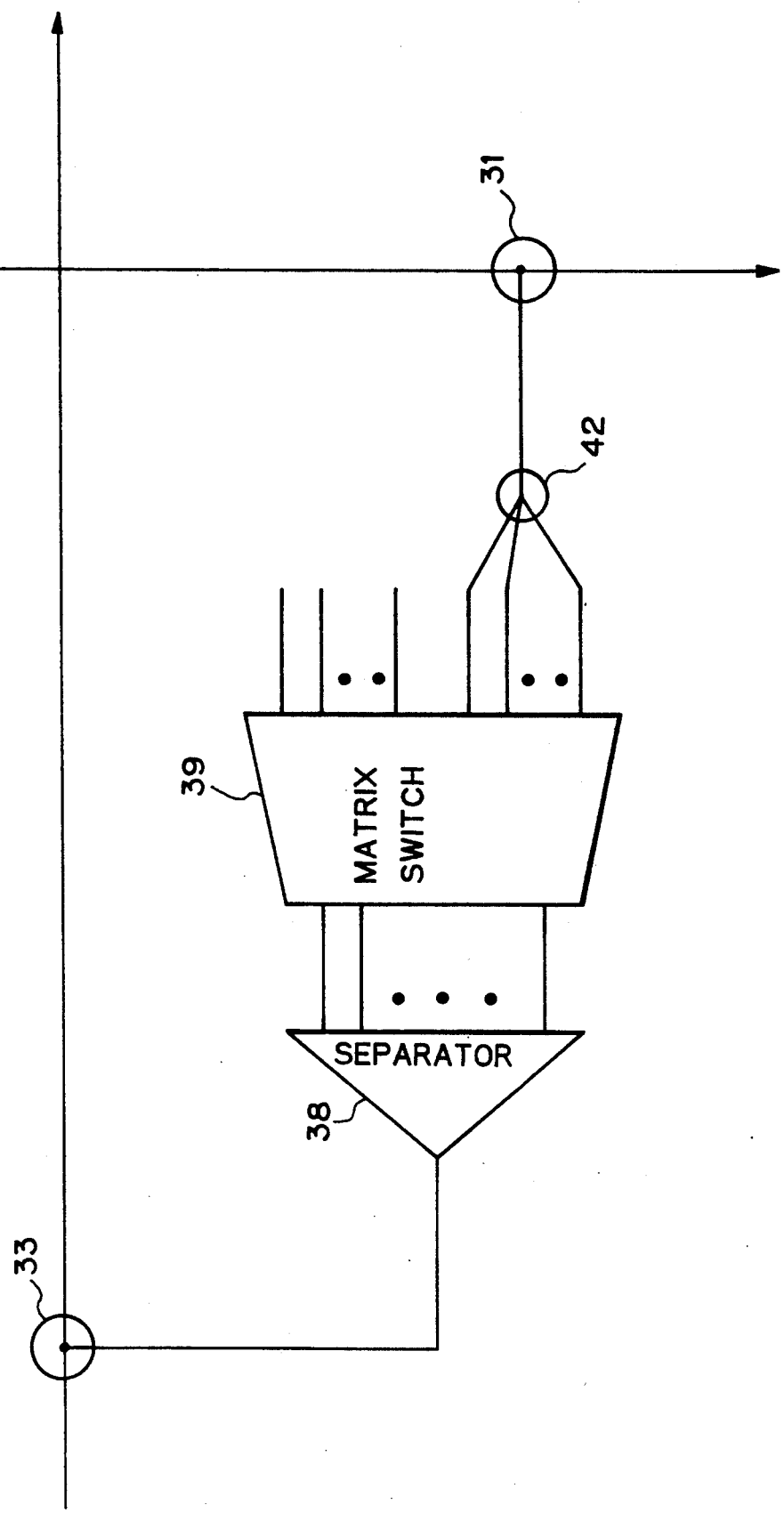
FIG. 12 illustrates another example of the switchboard shown in FIG. 6.

FIG. 12 illustrates another example of optical switch unit 400. In this figure, an optical signal branched from a wavelength-multiplex communication path to one of the output lines of branch device 33 is separated to optical signals of respective wavelengths by a separator 38. The optical signals of the respective wavelengths are output from separator 38 to predetermined output lines. The outputs of separator 38 are spatially exchanged by an m×2 m matrix switch 39. Signals on m output lines are wavelength-multiplexed by a combining device 42 and output to the wavelength-multiplex communication path through combining device 31. The remaining signals, which are not output to the wavelength-multiplex communication path, are discarded through the remaining m output lines. The other output line of branch device 33 includes the optical signals of all the wavelengths and sent to the subsequent unit switch. Switching is executed by electrically controlling matrix switch 39 and control is performed by network channel control unit 500.

Figure 13:
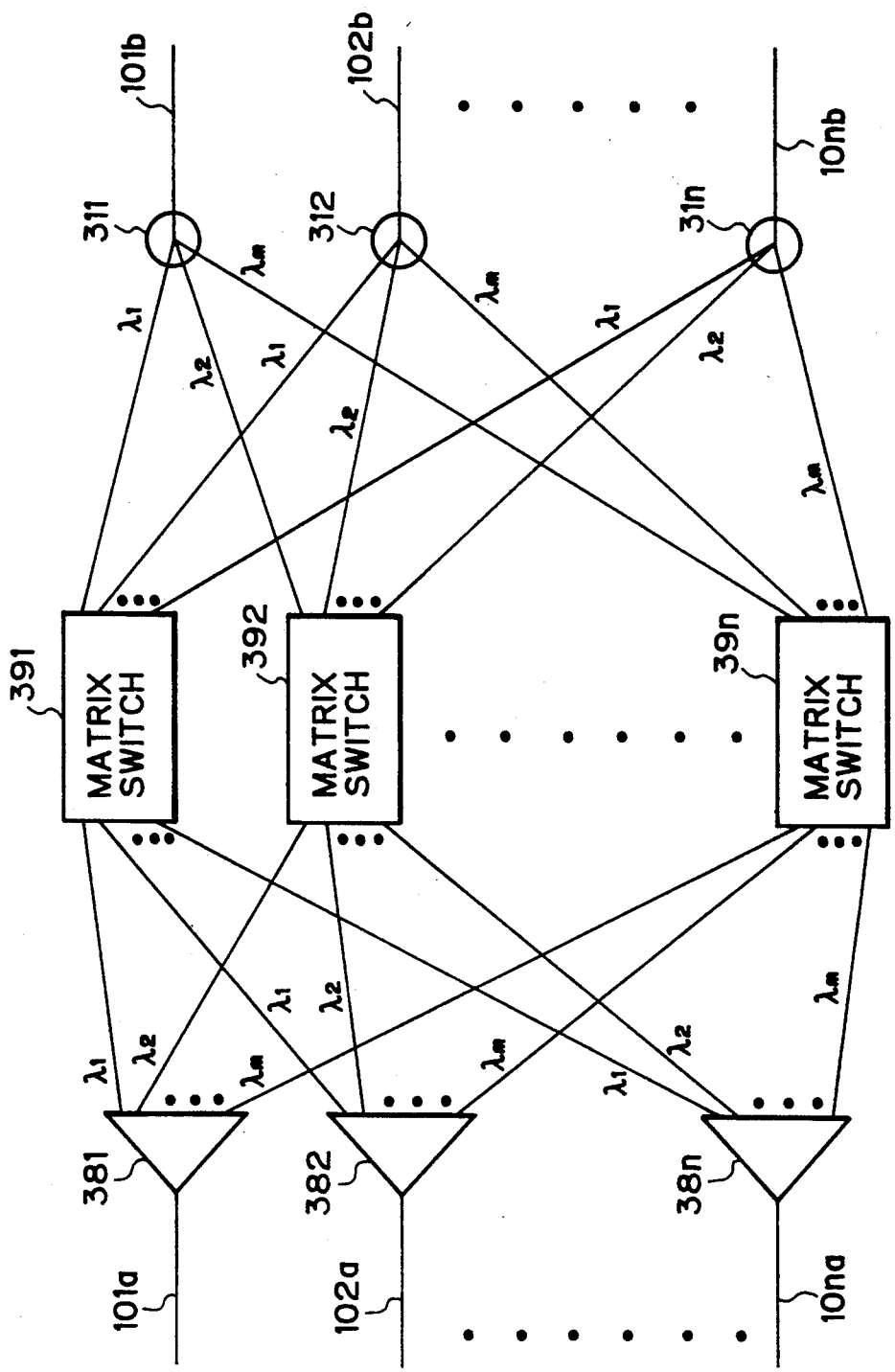
FIG. 13 illustrates a further example of the switchboard shown in FIG. 6.

FIG. 13 illustrates a further example of optical switch unit 400. In this figure, optical signals λ1 through λm supplied from wavelength-multiplex communication paths 101a through 10na and separated to respective wavelengths by separators 381 through 38n enter matrix switches 391 through 39m provided for the respective wavelengths. Each of matrix switches 391 through 39n outputs n signals each having the same wavelength. Combining devices 311 through 31n receive signals having wavelengths λ1-λm and multiplex and output the received signals to output lines 101b–10nb. Distribution of the respective wavelength signals is executed by matrix switches 391 through 39n.

Figure 14:
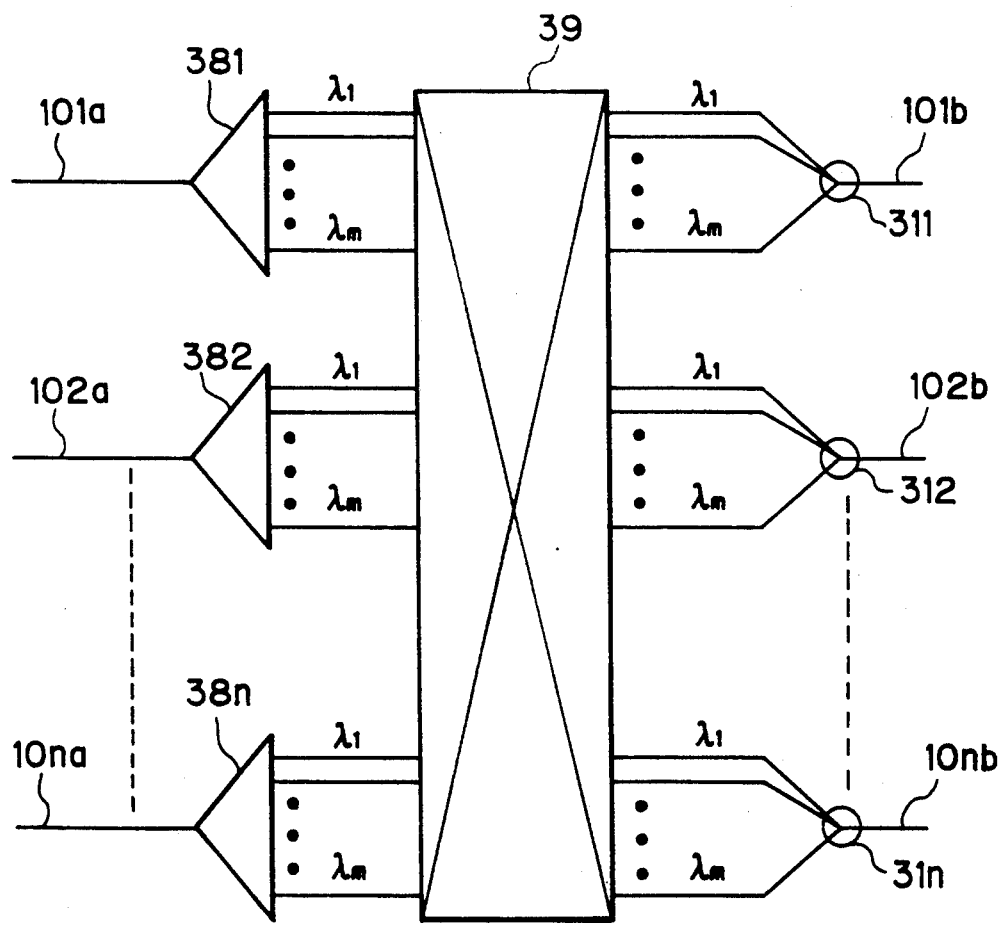
FIG. 14 illustrates a variation to the switchboard shown in FIG. 13.

Although, in the above-described example, m spatial switches are required, it is possible to provide only one switch 39, as shown in FIG. 14.

Figure 15:
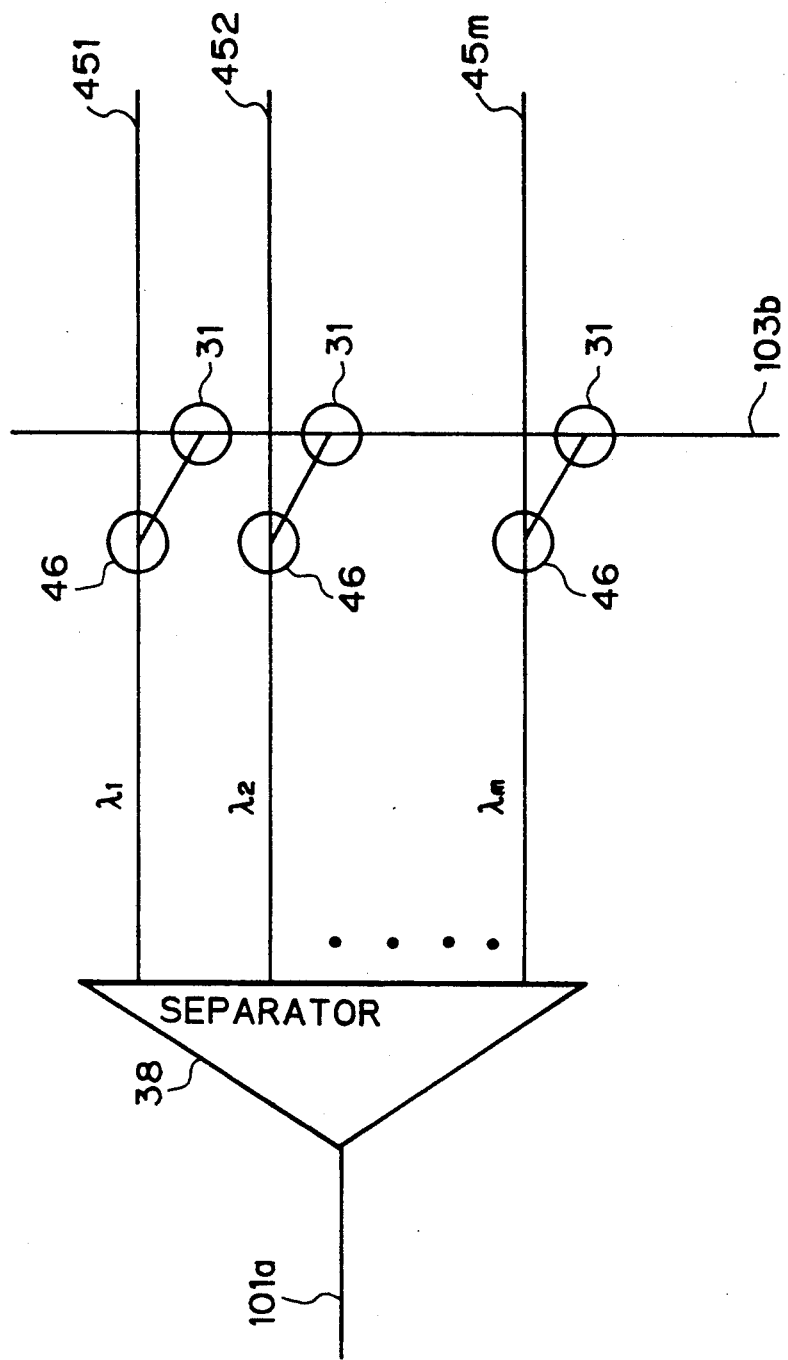
FIG. 15 illustrates still another example of the switchboard shown in FIG. 6.

FIG. 15 illustrates still another example of optical switch unit 400. Optical signals λ1 through λm supplied from wavelength-multiplex communication path 101a and separated to respective wavelengths by separator 38 are passed to communication paths 451 through 45m corresponding to the respective wavelengths. Respective communication paths 451 through 45m each include 1×2 switches 46, and combining devices 31 are provided at crossing points with output wavelength-multiplex communication path 103b. An optical signal selected by 1×2 switch 46 is wavelength-multiplexed at wavelength-multiplex communication path 103b by combining device 31. Each optical signal is distributed by 1×2 switch 46.

As explained above, according to a wavelength-sharing optical exchange system of the present invention, a wavelength to be used is assigned to a call by network channel control unit in accordance with the status of the exchange network at the time the call is placed. Accordingly, no wavelength conversion is required and more terminals than the number of wavelengths can be connected, resulting in effective utilization of wavelength.

Furthermore, since an optical switch unit can be formed by waveguide-type components, a stable performance may be attained.

What is claimed is:

1. An optical communication system comprising:
   a plurality of wavelength-multiplex communication paths for transmitting a plurality of optical wavelength signals;
   a network connected to said plurality of wavelength-multiplex communication paths;
   a plurality of terminals connected to said plurality of wavelength-multiplex communication paths, each terminal capable of generating and outputting a connection request signal at a predetermined control wavelength and setting a transmission wavelength and a reception wavelength, each to a selected unused wavelength, in response to a wavelength information signal;
   a wavelength controller separate from the plurality of terminals and coupled to one of the plurality of wavelength-multiplex communication paths, which in response to the connection request signal output by a calling terminal selects the unused optical wavelengths on said wavelength-multiplex communication paths and outputs the wavelength information signal containing information relating to the selected wavelengths at the control wavelength.

2. A wavelength-sharing optical exchange system comprising:
   a plurality of wavelength multiplex communication means for transmitting a plurality of optical wavelength signals;
   terminal means, coupled to said communication means, for generating and outputting a connection request signal at a predetermined control wavelength and for setting a transmission and a reception wavelength, each to an unused wavelength, in response to a wavelength information signal;
   line control means, separate from said plurality of terminal means and coupled to one of said plurality of communication means, for detecting the connection request signal and for generating and outputting the wavelength information signal, at the control wavelength, containing information relating to the selected unused wavelengths;
   channel control means, coupled to said line-control means, for selecting the unused wavelengths for an optical communication signal to be transmitted over said communication means and for outputting a control signal; and
   an optical switch means for establishing a communication path between the plurality of communication means in accordance with the control signal output from said channel control means.

3. A wavelength-sharing optical exchange system as claimed in claim 2, wherein said optical switch means comprises:
   branching means for branching optical signals from said plurality of wavelength-multiplex communication means and for outputting said branched optical signals;
   separating means for receiving the branched optical signals, for separating the branched signals to optical signals of different wavelengths and for outputting the separated optical signals;
   spatial switch means for receiving the separated optical signals, for spatially exchanging and selecting the separated optical signals and for outputting selected optical signals;
   first combining means for receiving the selected optical signals, for wavelength-multiplexing the selected optical signals and for outputting the combined selected optical signals; and
   second combining means for receiving the combined selected optical signals forwavelength-multiplexing the optical signals and for coupling the multiplexed signals to the wavelength-multiplex communication means.

4. A wavelength-sharing optical exchange system as claimed in claim 2, wherein said optical switch means includes:
   a plurality of means, coupled to the plurality of wavelength-multiplex communication means for separating optical signals to optical signals of different wavelengths and for outputting the separated optical signals;
   spatial switch means for receiving the separated optical signals, for spatially exchanging and selecting the separated optical signals and for outputting the selected optical signals; and
   a plurality of combining means for receiving the selected optical signals, for wavelength-multiplexing the selected optical signals and for outputting a plurality of combined selected optical signals.

5. The optical communication system, as claimed in claim 1, wherein the plurality of terminals comprise:
   a controller, responsive to the wavelength information signal, which generates and outputs a control signal for setting the transmission and reception wavelengths;
   a receiver, responsive to the control signal, which changes the reception wavelength to the unused reception wavelength indicated by the control signal; and
   a light source, responsive to the control signal, which generates and outputs an optical signal at the unused transmission wavelength indicated by the control signal.

6. The optical communication system, as claimed in claim 1, wherein the transmission and reception wavelengths are set to be at the same unused wavelength.

7. The optical communication system, as claimed in claim 1, wherein the transmission and reception wavelengths are set to be at different unused wavelengths.

8. The wavelength-sharing optical exchange system, as claimed in claim 2, wherein the line control means comprises:
   means for receiving the connection request signal, for converting the connection request signal to an electric signal and for outputting the electric signal;

means, coupled to the channel control means, for receiving the electric signal and for generating and outputting a second electrical signal; and transmitting means for receiving the second electrical signal and for generating and transmitting the optical wavelength information signal at the control wavelength.

9. The wavelength-sharing optical exchange system, as claimed in claim 2, wherein the channel-control means comprises:

communication control means, coupled to the line control means, for generating and outputting a wavelength assignment signal;

switch control means, coupled to a means for storing a table of used wavelengths, for receiving the wavelength assignment signal, for selecting an unused wavelength and for generating and outputting the control signal.

10. The wavelength-sharing optical exchange system, as claimed in claim 2, wherein the plurality of terminal means comprise:

control means for receiving the wavelength information signal, and for generating and outputting a control signal for setting the transmission and reception wavelengths;

receiving means for receiving the control signal, and for changing its wavelength of operation to the unused optical wavelength indicated by the control signal; and transmitting means for receiving the control signal, and for generating and outputting an optical signal at the unused wavelength indicated by the control signal.

11. An optical communication system comprising:
a plurality of wavelength-multiplexed communication means for transmitting a plurality of optical wavelength signals;

a plurality of terminal means, coupled to the plurality of wavelength-multiplex communication means, for generating and outputting a connection request signal at a predetermined control wavelength and for setting a transmission and a reception wavelength, each to an unused wavelength, in response to a wavelength information signal;

wavelength control means, separate from the plurality of terminal means and coupled to one of the plurality of communication means, for receiving the connection request signal output by a calling terminal, for selecting the unused optical wavelengths on the wavelength-multiplex communication means and for outputting the wavelength information signal containing information relating to the selected wavelengths at the control wavelength.

12. The optical communication system, as claimed in claim 11, wherein the plurality of terminal means comprise:

means for receiving the wavelength information signal and for generating and outputting a control signal;

means for receiving the control signal and for changing the reception wavelength to the unused reception wavelength; and means for receiving the control signal and for generating and outputting an optical signal at the unused transmission wavelength.

13. The optical communication system as claimed in claim 11, wherein the transmission and reception wavelengths are set to be at the same unused wavelength.

14. The optical communication system, as claimed in claim 11, wherein the transmission and reception wavelengths are set to be at different unused wavelengths.

15. A wavelength-sharing optical exchange system comprising:

a plurality of wavelength-multiplex communication paths capable of transmitting a plurality of optical wavelength signals;

a plurality of terminals, coupled to the plurality of wavelength-multiplex communication paths, which generate and output a connection request signal at a predetermined control wavelength and set a transmission and a reception wavelength, each to an unused wavelength, in response to a wavelength information signal;

a subscriber-line controller, separate from the plurality of terminals and coupled to one of the plurality of wavelength-multiplex communication paths, which detects the connection request signal and generates and outputs the wavelength information signal, at the control wavelength, containing information relating to the selected unused wavelength;

a channel controller, coupled to the subscriber-line controller, which selects the unused wavelength for an optical communication signal to be transmitted over the wavelength-multiplex communication paths and which generates and outputs a control signal; and an optical switch network, responsive to the control signal, which establishes a connection between the wavelength-multiplex communication paths.

16. The wavelength-sharing optical exchange system, as claimed in claim 15, wherein the subscriber-line controller comprises:

a photoelectric converter, responsive to the connection request signal, which converts the connection request signal to an electrical signal and outputs the electrical signal;

a controller, responsive to the electrical signal and coupled to the channel controller, which generates and outputs a second electrical signal; and a laser diode, responsive to the second electrical signal, which generates and outputs the optical wavelength information signal at the control wavelength.

17. The wavelength-sharing optical exchange system, as claimed in claim 15, wherein the plurality of terminals comprise:

a controller, responsive to the wavelength information signal, which generates and outputs a control signal for setting the transmission and reception wavelengths;

a receiving circuit, responsive to the control signal, which changes the reception wavelength to the unused reception optical wavelength indicated by the control signal; and a light source, responsive to the control signal, which generates and outputs an optical signal at the unused transmission wavelength indicated by the control signal.

18. The wavelength-sharing optical exchange system, as claimed in claim 15, wherein the optical switch network comprises:

branching devices, coupled to the plurality of wavelength-multiplex communication paths, which branch optical signals from the wavelength-multiplex communication paths and output the branched optical signals;

separators, responsive to the branched optical signals, which separate the branched optical signals to optical signals on different wavelengths and output the separated optical signals;

a spatial switch, responsive to the separated optical signals, which spatially exchanges and selects the separated optical signals and outputs the selected optical signals;

a first combiner, responsive to the selected optical signals, which combines and outputs the combined selected optical signals; and a second combiner, responsive to the combined selected optical signals, which couples the combined optical signals to the wavelength-multiplex communication paths.

19. The wavelength-sharing optical exchange system, as claimed in claim 15, wherein the optical switch network comprises:

a plurality of separators, coupled to the plurality of wavelength-multiplex communication paths, which separate optical signals to optical signals on different wavelengths and output the separated optical signals;

a spatial switch, responsive to the separated optical signals, which spatially exchanges and selects the separated optical signals and outputs the selected optical signals; and a plurality of combiners, coupled to the selected optical signals, which combine the selected optical signals and output a plurality of combined selected optical signals.

20. The wavelength-sharing optical exchange system, as claimed in claim 15, wherein the channel controller comprises:

a communication controller, coupled to the subscriber-line controller, which generates and outputs a wavelength assignment signal;

a switch controller, coupled to a table storing used wavelengths and responsive to the wavelength assignment signal, which selects the unused wavelengths and generates and outputs the control signal.

* * * * *

UNITED STATES PATENT AND TRADEMARK OFFICE
CERTIFICATE OF CORRECTION

PATENT NO. : 5,319,485
DATED : June 7, 1994
INVENTOR(S) : Tadahiko Yasui and Aritomo Uemura It is certified that error appears in the above-identified patent and that said Letters Patent is hereby corrected as shown below:

Title page, item:[30] Foreign Application Priority Data please change "Oct. 5, 1991" to read -- May 10, 1991 --.

Signed and Sealed this

Twentieth Day of September, 1994

Attest:

*Attesting Officer*

BRUCE LEHMAN
*Commissioner of Patents and Trademarks*